Aug. 23, 1966    E. T. LA ROE ETAL    3,268,188
STORE CARRIER WITH SWAY BRACED LUG

Filed July 1, 1964    3 Sheets-Sheet 1

INVENTORS
GUY B. RIGHTER
BY
Leon D. Rosen
ATTORNEY

INVENTORS
GUY B. RIGHTER
BY
Leon D. Rosen
-ATTORNEY-

United States Patent Office 3,268,188
Patented August 23, 1966

3,268,188
STORE CARRIER WITH SWAY BRACED LUG
Emmett T. La Roe, Los Angeles, Guy B. Righter, Manhattan Beach, and Edward A. Strate, Los Angeles, Calif., assignors to Douglas Aircraft Company, Inc., Santa Monica, Calif.
Filed July 1, 1964, Ser. No. 379,623
14 Claims. (Cl. 244—118)

This invention relates to a carrying device for vehicles such as aircraft, for holding and jettisoning bombs, rockets, and other stores.

Aircraft, and especially military aircraft, are often provided with bombs, rockets, and other stores which must be quickly released in flight. Generally these stores are hung beneath the wings or fuselage of the craft on pylons and must be braced against swaying. Heretofore, sway bracing members have generally been provided which extend from the aircraft pylon to the store and hold it on either side. These bracing members cause a considerable wind resistance and when used on an aircraft which flies at very high speeds, considerably reduces the speed and range of the craft.

This invention provides a store holding system in which the lug attached to the store to hold it to the craft, is rigidly held against swaying so that no external sway brace is required. Furthermore, when the lug and attached store are jettisoned there is no part protruding from the aircraft pylon and the store holding system then produces a minimum of aerodynamic drag.

Accordingly, one object of the present invention is to provide a store carrier system which adds a minimum of wind resistance.

Another object of the invention is to provide a store carrier system in which the lug by which the store is carried is used to brace the store against swaying.

Still another object of the invention is to provide a more efficient store carrier for high speed craft than has been available heretofore.

These and other objects and a more complete understanding of the invention may be had by reference to the following description and claims taken in conjunction with the accompanying drawings in which:

FIG. 3 is a side elevation view of the lug supporting mechanism of the present invention.

Figure 1:
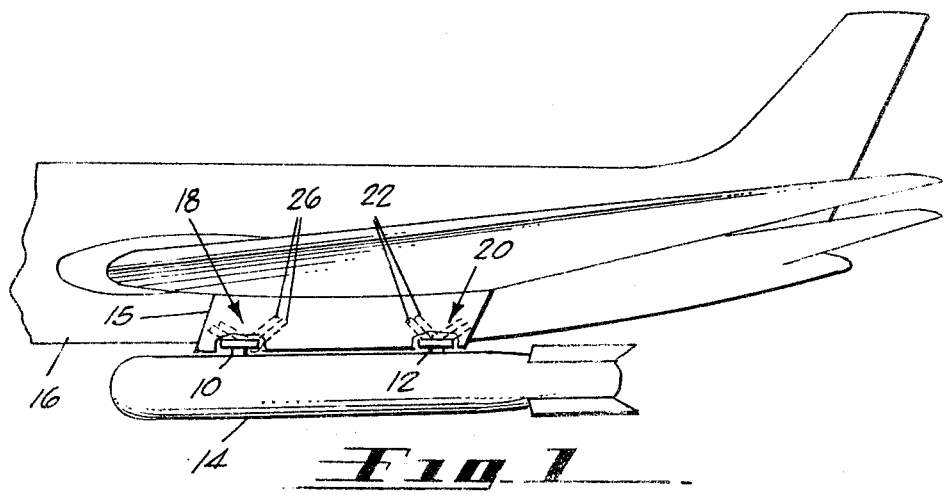
FIG. 1 is a pictorial view of an aircraft having a carrier system supporting a store, both constructed in accordance with the present invention.

Referring now to the figures and especially FIG. 1, the store carrier of the present invention generally comprises a pair of lugs 10 and 12 fastened to a bomb or other store 14 which is to be carried under a pylon 15 of a high speed aircraft 16. The aircraft 16 is provided with a suspension system containing a pair of longitudinally spaced carrier mechanisms 18 and 20 adapted to engage with the lugs 10 and 12 to hold them and the attached store 14.

Figure 2:
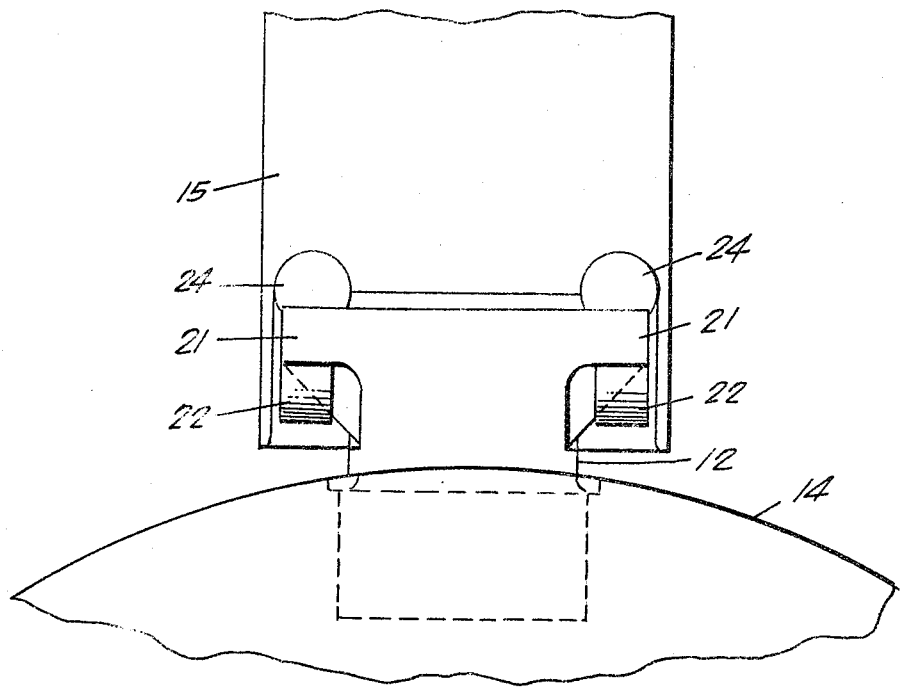
FIG. 2 is partial front elevation view showing the small wind resistance offered by the store carrier system of the present invention.
Figure 2:
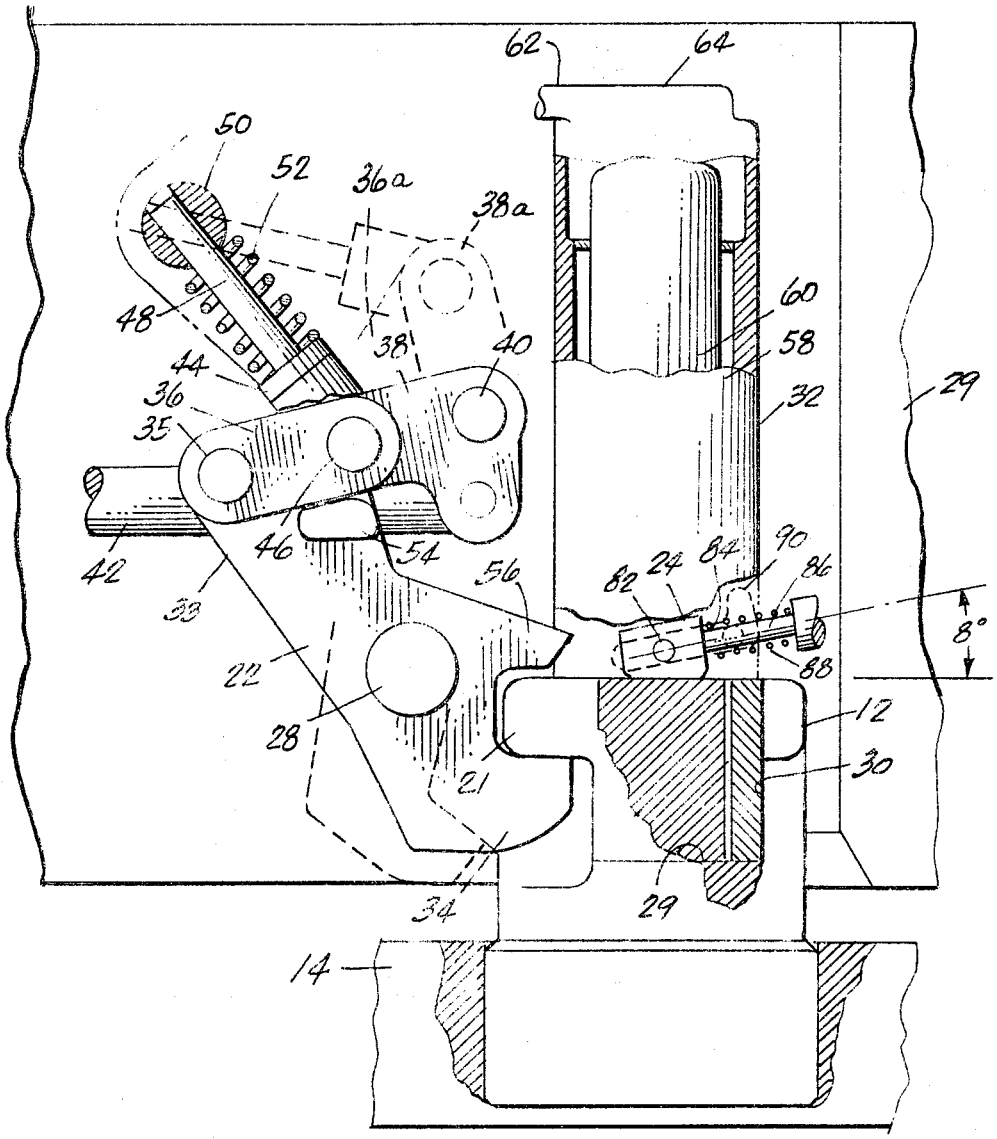

As illustrated in FIG 2, each lug 10 or 12 has a T shaped cross-section forming T-arms or protuberances 21. The lug 12 is supported by a dual hook 22 having laterally spaced engaging portions which fit beneath the T-arms of the lug and serve as holding or locking means to support its weight. Two laterally spaced sway bracing wedges 24 are held tightly against the top surface of the lug 12 and prevent swaying of the store 14.

The aerodynamic cross-section of the carrier mechanism is relatively small because no sway bracing arms must be provided. Heretofore, sway bracing arms extending from the aircraft to the body of the store were utilized. The combination of forces from the wedges 24 pushing downwardly and the dual hook 22 supplying a rigid support from underneath, prevents sideward swaying and obviates the need for additional sway braces.

We refer now to FIG. 3 which shows the details of a lug carrying mechanism and its three major components: a dual hook 22, an ejection assembly 32 and sway bracing wedges 24. The hook 22 has lower lips 34 for supporting the T-arms 21 which form a part of the lug. The hook is pivotally mounted on a shaft 28, about which it pivots to jettison the lug and attached store 14. The lug 12 is provided with a cylindrical hole or recess 30 for receiving an ejection assembly 32, which serves to thrust the lug 12 downwardly and clear of the aircraft after it is released by the hook. A sleeve 58 of the ejection assembly 32 is provided which engages the cylindrical hole 30 in the lug so as to brace the lug against fore and aft longitudinal loads and side loads. The wedges 24 are slidable members which are easily moved against the lug 12, but which hold it tightly and positively and are not pushed out of the way when large swaying forces are encountered on the store.

The shaft 28 on which the hook 22 pivots, is fixed to a housing 29 which is attached to the pylon of the aircraft. An operating end 33 of the hook is adapted to be moved, to rotate the hook about the shaft 28 and cause the hook's lower lips 34 to disengage from the lug in jettisoning the store. The mechanism for moving the operating end 33 includes a link 36 pivotally joined to the operating end 33, a crank 38 pivotally joined to the link and pivotally mounted on the housing by shaft 40, and a tie rod 42 pivotally joined to an arm of the crank 38. A clevis 44 having one end portion pivotally joined to the link 36 and crank 38 at joint 46, is provided to hold the hook mechanism in either of two positions, as will be explained hereinafter. The clevis 44 includes a rod portion 48 slidably mounted in a guide 50. The guide 50 is pivotally mounted on the housing 29. A compressed spring 52 is disposed around the rod portion 48 so that the clevis pushes against the joint 46. A protruding stop 54 formed on the hook 22 holds the link 36 and limits its downward movement.

When the lips 34 of the hook hold a lug of a store, the hook 22 tends to rotate clockwise. The clockwise rotation is resisted at the shaft 35 located at the operating end of the hook. The shaft 35 is held from moving by the link 36, which is held by the crank 38; the crank is held by the shaft 40 which is fixed to the housing 29. The tendency of the hook 22 to rotate clockwise merely causes the application of compressive forces on the link 36 and crank 38; since the link and crank are aligned, there are no forces tending to rotate them. The spring force supplied by the clevis 44 to the joint 46 and the stop 54 on the hook, together keep the link and crank arm aligned and the mechanism locked and in a cocked state.

In order to release the lug 10 and its attached store 14, the hook 22 must be rotated clockwise. This is accomplished by pulling on the tie rod 42 so as to rotate the crank 38 in a clockwise direction. As the crank rotates to the position shown at 38a, it moves and rotates the link 36 to the position shown at 36a. The shaft 35 is thus moved and carries the end 33 of the hook, and causes the hook 22 to pivot in a clockwise direction about the shaft 28. As the hook 22 rotates, the lower lips 34 disengage from the lug 12 and allow it and the attached store 14 to drop.

When the crank 38 is rotated to position 38a, it is held in this position by the clevis 44. The clevis first resists rotation of the crank 38 because such rotation further compresses the spring 52. However, once the clevis 44 has moved past a position in which the rod 48 points directly at the shaft 40, further rotation of the crank decompresses the spring 52. When the crank reaches the position at 38a, the clevis tends to hold it there.

Although the lug and attached store would normally fall away from the aircraft when released, it is often important to assure that the store will be positively ejected, and with a substantial velocity. If only gravity is relied upon, the store may bang against the aircraft when left to the large aerodynamic forces encountered at high speeds, and it may be difficult to drop the store accurately or assure that it will fall on a desired ground location in the case of bombs or the like. Accordingly, an ejection assembly 32 is provided to eject the lug 12 positively. A similar assembly is provided to eject lug 10.

The ejection assembly 32 comprises a sleeve 58 which surrounds a piston 60, the piston mounted so as to be freely movable within the sleeve. The ends of both of them are received in a depression or hole 30 formed in the lug 12. A conduit 62 leading to one end 64 of the sleeve 58 carries gas to the interior of the sleeve. The sleeve end 64 is sealed so that the gas pushes against the piston 60 and forces it against the lug 12. The force of the piston 60 against an upward surface 29 of the lug 12 propels the lug 12 and attached store 14 downwardly so that they quickly clear the aircraft carrying them.

In jettisoning a store, it is necessary that the hooks 22 and 26 release the lugs before the piston in each lug can thrust it downwardly. An initiating assembly shown in FIG. 4 pulls the tie rods 42 and 43 to release the hooks 22 and 26 at the same time that gas is released through conduits 62 and 63 to operate the pistons of each ejection assembly.

Figure 4:
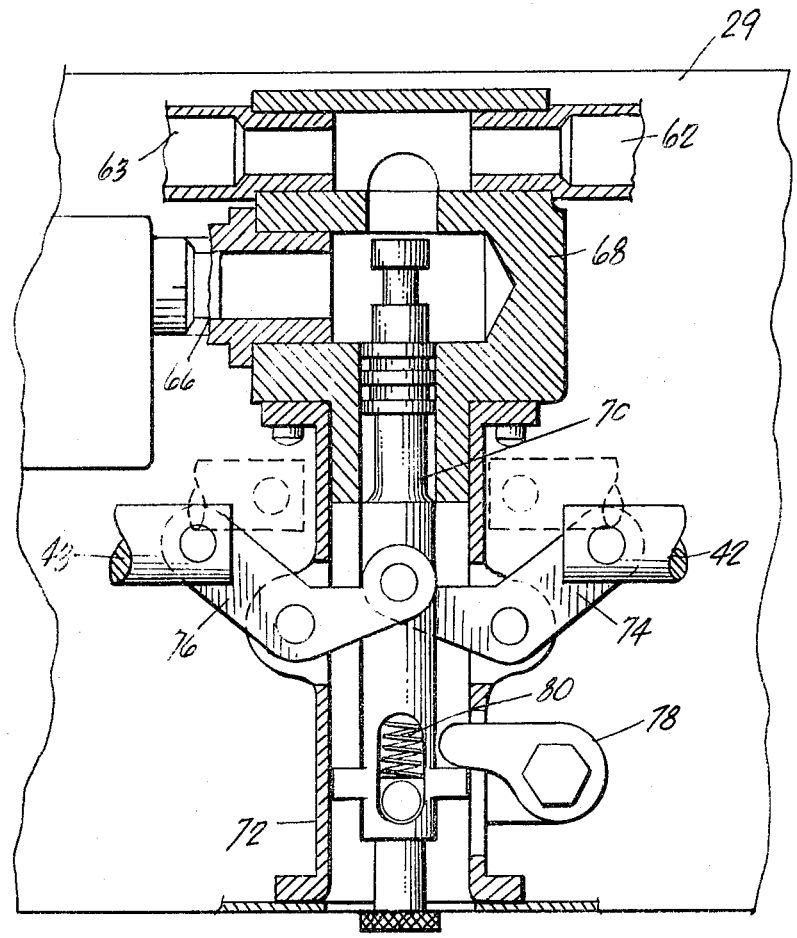
FIG. 4 is a partially sectional side elevation view of an initiating mechanism of the present invention.

The initiating assembly shown in FIG. 4 comprises an inlet tube 66 through which is received pressured gas from an explosive cartridge, a stored gas supply or other means when a store is to be released. The inlet tube 66 is connected to a chamber fitting 68 which forms a chamber. The tie rod activating piston 70 open to the chamber fitting 68 is provided so that when the chamber is filled with pressured gas the piston 70 is activated. The piston 70 is slidably mounted in the chamber 68 and in a sleeve 72. The piston is pivotally attached to one end of tie rod cranks 74 and 76. The center portions of the cranks 74 and 76 are pivotally mounted on the sleeve 72, and the opposite ends of the cranks are pivotally connected to the tie rods 42 and 43. When the piston 70 moves downwardly, it causes the cranks 74 and 76 to rotate and pull on the tie rods 42 and 43. As the tie rods are pulled, they cause the hooks 22 and 26 to release their lugs, in the manner described hereinabove for the rearward carrier mechanism 20 and its hook 22. A return spring 80 is inserted in the tie rod piston in the manner shown to enable the return of the piston to its normal position after activation.

Gas for operating the ejection assembly 32 and a similar assembly associated with the forward carrier mechanism, is conducted from the inlet tube 66 to the chamber of the fitting 68 and into conduits 62 and 63. Gas passes through the conduit 63 to operate the ejection assemblies 32 as the piston 70 is moved to operate the hook 22. The hooks operate just prior to movement of the ejection piston because more time is required for the build-up of the required gas pressure in sleeve 58 than is required for the build-up of the relatively low pressures in chamber 68 which is required to move the piston 70 and operate the hooks.

The width of the lugs 10 and 12 is relatively small, so that large forces must be applied to brace them against sideward swaying. The sway bracing wedges 24 shown in detail in FIG. 3 provide this bracing. The wedges are generally cylindrical but with a flattened circumferential portion where the wedge contacts the lug 12. A guide pin 82 fixed to the wedge 24 confines it to linear motion along a slot indicated at 84 formed in a portion (not shown) of the housing 29. A rod 86 fixed to the housing 29 extends through a hole in the wedge 24. A spring 88 disposed about the rod 86 biases the wedge 24 against the top of the lug 12.

The slot 84 and rod 86 extend at an angle of about 8° with respect to the top surface of the lug 12. When the wedge 24 is moved so as to compress the spring 88, the wedge moves a small distance away from the top of the lug. When released, it moves against the top of the lug 12 to hold it firmly against upward movement. When the store 14 to which the lug 12 is attached begins to sway, the lug pushes upward against a wedge 24. However, the wedge does not move upward but instead locks in position, because the force on the wedge then has a component in the direction along the slot 84 and rod 86 of about 8% of the total swaying force. The coefficient of friction of the wedge 24 on the housing 29 is much greater than 0.08, so the wedge locks in position and resists the lug 12. Of course, other angles than 8% can be employed, as long as the component of swaying force tending to compress the spring 88, which is proportional to the sine of the subject angle, is smaller than the frictional resistance. In other words, the sine of the angle must be smaller than the coefficient of friction of the wedge 24 on its guide. An angle of 8° and wedge and housing materials of steel have been found to comply with this requirement. The wedges do not necessarily have to press against the top of the lug, but could press against opposite sides thereof. The path of the wedge must, however, make a small angle with a plane which passes through the fore and aft stations 18 and 20 and the axis or center of the store 14.

The wedges 24 thus are easily positioned against the lug 12, yet hold the lug securely against swaying. A notch 90 is provided at one end of the slot 84 to temporarily hold the wedge away from the lug while the lug and store are being loaded on the aircraft.

A store is loaded onto the store carrier by first moving the wedge 24 upward so that its guide pin 82 is held in the notch 90. The hooks 22 and 26 are then moved to their released position, shown in phantom lines in FIG. 3. This may be accomplished by rotating a dog 78, shown in FIG. 4, by means of a wrench, thus pulling on the tie rods 42 and 43. The hole 30 of the lugs 10 and 12 are aligned with their respective ejection assemblies such as the rearward assembly 32, and the lugs are then lifted upward under the hooks. The lug 12 is lifted so that the lower lips 34 shown in FIG. 3 are engaged under the T-arms of the lug 12. In lifting the lug 12 up as far as it will go, the top surface of the lug pushes against a hook cocking lip 56 and moves it upwardly so that hook 22 rotates counterclockwise. The shaft 35 at the operating end of the hook pulls the link 36 and causes the clevis 44 to rotate downwardly until the link 36 hits the stop 54 formed on the hook 22. The hook 22 is then locked in place or cocked as described hereinbefore. The same operation also is performed for lug 10.

The combination of a dual hook 22 which holds the lug from beneath, and two wedges 24 which press downwardly on the lugs at each station prevents swaying of the store. However, a single hook and two wedges or a dual hook and one wedge will also prevent swaying, though with less effectiveness.

Although particular mechanisms are shown and described for operating the supporting hooks, the ejection assemblies and the wedges, obviously many other types of mechanisms may be used. Furthermore, many modifications and variations may be employed in the parts used and their particular forms and arrangements. However, the invention is not directed merely to the particular mechanisms, but is directed to a new concept for holding stores and especially to means for bracing them against swaying, and yet providing a minimum of aerodynamic or wind resistance.

Accordingly, the invention is not limited to the particular described embodiment, but is limited only by a just interpretation of the following claims.

We claim:
1. A sway braced store carrier mechanism comprising:
   a store;
   a lug means connected to said store;
   a hook means having a lip portion being adapted to engage a portion of said lug;
   a first wedge means being adapted to contact said lug means and restrain movement of said lug means away from said lip portion of said hook means; and
   a second wedge means being spaced laterally from said first wedge means and being adapted to contact said lug means, whereby said lug means is capable of disengagement with said hook means thereby releasing said store.

2. A sway braced store carrier mechanism as defined in claim 1 wherein:
   said hook means is mounted so that said lip means swings away from the portion of said lug means with which it engages, in releasing said store, whereby said lug is released smoothly and in a controlled fashion.

3. A sway braced store carrier mechanism as defined in claim 2 wherein:
   said hook means includes a hook cocking lip arranged for contact with a portion of said lug means when said lug means is initially placed in contact with said hook means, so that the loading movement of said lug moves said hook cocking lip means and causes cocking of said hook into a lug-supporting position.

4. A sway braced store carrier mechanism as defined in claim 1 wherein:
   said first and second wedge means are slidable members mounted to slide along a path defining a small angle with the surface of said lug on which it presses, said angle having a sine smaller than the coefficient of friction of said wedges on their slide supports.

5. A sway braced store carrier mechanism as defined in claim 4 wherein:
   said angle is approximately 8 degrees.

6. A sway braced store carrier mechanism as defined in claim 1 wherein:
   said hook means comprises at least two laterally spaced lip portions adapted to engage said portion of said lug.

7. A sway braced store carrier system for holding lug supported stores comprising:
   at least two lugs adapted for attachment to a store;
   a head on said lugs, having protuberances for enabling gripping from a generally lowerly positioned surface thereof to support said lugs, and having a generally upwardly positioned surface adapted to engage a jettisoning piston;
   housing means having longitudinally spaced forward and rearward stations;
   hooks pivotally mounted on said housing means at each station thereof, said hooks having gripping end portions and operating end portions;
   a first lip on said gripping end of each of said hooks for gripping said protrusions on said lugs;
   a hook cocking lip on said gripping end of each of said hooks for enabling the rotation of said hooks when a lug is loaded onto said carrier system;
   a link pivotally attached to said operating end of each of said hooks;
   a crank pivotally mounted on said housing and having a first arm pivotally connected to said link, and a second arm;
   biasing means for holding said link in such a position that an imaginary line extending between the points of connection of said link to said operating end and to said crank approximately intersects the point of pivotal connection of said crank to said housing;
   a tie rod pivotally connected to said second arm;
   a gas operated mechanism mounted on said housing for pulling said tie rod;
   a piston holding sleeve means mounted on said housing at each station thereof;
   a piston slidably mounted in said piston holding sleeve means and having a first end portion adapted to abut said generally upwardly positioned surface of each of said lugs;
   a conduit connected to an end of said piston holding sleeve, for conducting pressured gas thereto for operating said piston; and
   a pressured gas supply means connected to said conduit and also to said gas operated mechanism for pulling said tie rod.

8. A sway braced store carrier system as defined in claim 7 including:
   sway bracing wedges slidably mounted on said housing for abutting a wedge engaged surface of said lugs, said wedges mounted so as to slide along a path which moves them both against and parallel with said wedge engaged surfaces of said lugs; and
   biasing means for biasing said wedges against said lugs.

9. A sway braced store carrier system as defined in claim 8 including:
   a slot in said housing for confining said wedge, said slot including a notch for enabling the holding of said wedge away from the position normally occupied by said wedge engaged surfaces of said lug.

10. In a store carrier mechanism for holding elongated stores on an aircraft by means of laterally spaced lugs, a sway bracing mechanism comprising:
    an aircraft having a streamlined surface; and
    at least two laterally spaced wedge means disposed within said streamlined surface of said aircraft and against at least one of said lugs, said wedge means movable against at least one of said lugs and lockable thereagainst to prevent lateral swaying of said stores.

11. A sway bracing mechanism as defined in claim 10 wherein:
    said wedge means comprises a wedging block slidable against a surface of said lug along a path defining a small angle with a plane passing through said lugs and the centerline of said store.

12. In a store carrier mechanism for use in holding a lug-supported store having at least one lug wherein said lug has a recess of a predetermined cross-section formed by walls, said lug being retained by a holding means, the combination with said mechanism of an ejection assembly comprising:
    A sleeve having an end portion, said sleeve having a predetermined cross-section for abutting the walls of said recess so as to apply side restraining forces thereto in all directions when said end portion of said sleeve is received in said recess;
    piston means slidably mounted within said sleeve for movement past the end of said sleeve so as to eject said lug;
    piston moving means for slidably moving said piston relative to said sleeve; and
    a connecting means operable between said piston and said holding means whereby said lug is released from the action of said holding means substantially simultaneously with the movement of said piston effecting the ejection of said lug.

13. A store adapted to be held by a store holding mechanism having hooks and sway bracing wedges comprising:
    an elongated store body;

a fore lug and an aft lug fastened to said store body;

head portions formed on said lugs, said head portions having protuberances extending from opposite lateral sides thereof for enabling the engagement of said lug by hooks of said store holding mechanism; and a surface formed on said head portions for enabling the abutment of said lugs with laterally spaced sway bracing wedges.

14. A sway braced store carrier for holding a lug supported store on a craft comprising:

a first station including a first engaging means for engagement with a first lug of said store to support said store, wedge means contacting said lug to resist lateral swaying moments of said store;

a second station longitudinally spaced from said first station and including a second engaging means for engagement with a second lug of said store;

initiating means for moving said engaging means at each of said stations thereby releasing said lugs substantially simultaneously;

ejection means including a piston to contact said lugs in jettisoning said stores; and operating means for moving said piston immediately upon disengagement of said lugs.

References Cited by the Examiner
UNITED STATES PATENTS

| | | | |
|---|---|---|---|
| 2,896,509 | 7/1959 | Musgrave | 244—137 X |
| 3,010,752 | 11/1961 | Geffner | 244—137 X |
| 3,059,956 | 10/1962 | Geffner | 244—137 X |
| 3,089,387 | 5/1963 | Damm | 244—137 X |

References Cited by the Applicant
UNITED STATES PATENTS

| | | |
|---|---|---|
| 2,422,660 | 6/1947 | Elder et al. |
| 2,822,207 | 2/1958 | Steinmetz et al. |
| 2,852,981 | 9/1958 | Caya. |
| 2,856,224 | 10/1958 | Kelly et al. |
| 3,040,629 | 6/1962 | Duncan et al. |

MILTON BUCHLER, *Primary Examiner.*

ALFRED E. CORRIGAN, *Examiner.*